United States Patent Office 3,464,878
Patented Sept. 2, 1969

3,464,878
PROCESS OF BONDING RUBBER TO POLYESTER TIRE CORD AND COMPOSITION
Eckhard Christian August Schwarz, Grifton, N.C., assignor to E. I. du Pont de Nemours and Company, Wilmington, Del., a corporation of Delaware
No Drawing. Filed Nov. 23, 1965, Ser. No. 509,436
Int. Cl. C09j 5/00
U.S. Cl. 156—330                        13 Claims

ABSTRACT OF THE DISCLOSURE

Improved adhesion of rubber to polyester tire cord or other polyester shaped structures is obtained by precoating the polyester with a composition containing 2-pyrrolidone, a polyepoxide and an alkaline catalyst. Bonds obtained with conventional resorcinol-formaldehyde-latex (RFL) type adhesive are comparable to nylon-rubber bonds with RFL adhesive. RFL adhesive can be included in the pyrrolidone composition.

---

This invention relates to the treatment of fibrous material to improve its adhesion to rubber. More particularly, it relates to a novel adhesive composition, adhesive-coated structures, and a method for improving the adhesion of shaped structures to rubber which is particularly suitable for synthetic linear condensation polyester fibers.

In contrast to the naturally occurring polymer fibers such as cotton and the older synthetic fibers such as nylon, the new polyester fibers have been found particularly difficult to bond to rubber. The outstanding properties of polyethylene terephthalate fibers and their commercial availability have made it highly desirable that good polyester-to-rubber adhesives be developed. A number of such adhesives have been proposed, but none of these have been fully satisfactory in practical applications. One particular disadvantage of the known adhesives has been an excessive loss of adhesion upon exposure to elevated temperatures, particularly in the presence of water vapor.

The present invention provides a novel adhesive system capable of bonding synthetic polyester materials to rubber with good bond strength both at low and high temperatures. Furthermore, the bond is extraordinarily resistant to high-temperature hydrolytic degradation. The adhesive mixture is prepared from low cost ingredients and may be applied to polyester structures in either a two-dip or a single-dip application, thereby offering manufacturers a desirable choice of process conditions. The adhesive mixture may be applied in undiluted form or it may be diluted either with water or an organic solvent, as desired. Dilution with water is preferred where health and fire hazards must be minimized.

In accordance with the present invention, shaped polymeric structures are bonded to rubber by a process which comprises coating the structure with a mixture of (a) 2-pyrrolidone, (b) a polyepoxide having an average of at least 2 epoxy groups in each molecule, a melting point below 150° C., an average molecular weight below about 3000 and an epoxide equivalent below about 2,500 and (c) an alkaline catalyst. The treated material is dried at a temperature above 170° C., but below the melting point of the fiber, to effect a reaction between the coating ingredients before bonding to rubber. The shaped polymeric structure is also treated with a conventional resorcinol-formaldehyde-latex (RFL) adhesive mixture before bonding to rubber. The RFL mixture may be applied simultaneously with the epoxide-pyrrolidone mixture, using a single aqueous-based medium containing all the ingredients, or the RFL mixture may be applied as a second coating after the epoxide-pyrrolidone mixture has been applied and dried on the structure. Where the shaped structure is fibrous in nature, it is preferred that the structure be subjected to at least sufficient tension to prevent excessive shrinkage during the wetting and subsequent curing operations. After drying and curing the adhesive coating on the polymeric structure, rubber is applied and cured in conventional fashion to produce a reinforced rubber-shaped structure.

In preferred embodiments of the invention, designed for superior performance under the most adverse conditions, the above adhesive mixture of polyepoxide pyrrolidone and catalyst also contains formaldehyde or a blocked isocyanate, or, in some instances, both formaldehyde and a blocked polyisocyanate.

The term "polyepoxide" is used to describe uncured chemical compounds having an average of at least 2 epoxy groups, groups having the formula $$-\overset{O}{\overset{\diagup\diagdown}{C\text{———}C}}-$$

in each molecule, a melting point below 150° C., an average molecular weight below 3000, and an epoxide equivalent below 2500. The preferred epoxy compounds are the liquid aliphatic epoxy compounds which are soluble or easily dispersible in water. They may be saturated or unsaturated, may contain substituents for hydrogen such as alkyl, halogen, hydroxyl, and alkoxy. Such compounds are commonly prepared by the reaction of halohydrins with polyhydric alcohols as, for example, the reaction of epichlorohydrin with glycerol. Such compounds are disclosed in Epoxy Resins by Lee and Neville, McGraw-Hill Book Company, Inc. (New York 1957), pp. 1–21. The term "epoxide equivalent" is the weight of resin in grams which contains 1 gram chemical equivalent of epoxy groups. The value is determined by the method described in Lee and Neville at page 21.

By "2-pyrrolidone" is meant the organic lactam having the formula $$\begin{array}{c} CH_2\text{——}CH_2 \\ | \quad\quad\quad | \\ O=C \quad\quad CH_2 \\ \diagdown\;\diagup \\ NH \end{array}$$

It is preferred that 2-pyrrolidone be present in sufficient quantity so that the weight ratio of polyepoxide to pyrrolidone is within the range of 1.5:1 to 1:10.

By "blocked isocyanate" is meant an organic polyisocyanate in which the isocyanate groups have been rendered temporarily inactive. Suitable blocked isocyanates include members of the class $R(NHCOX)_n$ where R is an alkyl, aryl, or alicyclic radical, $n$ is an integer of at least 2, and X represents an aryloxy, arylthio, iminoxy, or lactam-N-yl radical. Such compounds are adducts of an organic polyisocyanate and an active hydrogen compound exemplified by phenols, thiophenols, oximes, and lactams. The term "blocked isocyanate" also includes dimers and polydimers having the formula $[R'(NCO)_n]_m$ where R' is an alkyl or aryl radical and $n$ and $m$ are integers of at least 2. Such dimers and polydimers are formed by self-condensation of two or more polyisocyanate molecules, and consist of hydrocarbon radicals connected by the uretidinedione structure $$\begin{array}{c} O \\ \| \\ C \\ \diagup\;\diagdown \\ -N \quad\quad N- \\ \diagdown\;\diagup \\ C \\ \| \\ O \end{array}$$

Blocked isocyanates are stable in the presence of water at room temperature, but dissociate when heated, yielding free-reactive isocyanate compounds. It is preferred that, when present in the adhesive mixture of this invention, the amount of blocked polyisocyanate is sufficient to give a weight ratio of polyisocyanate to pyrrolidone in the range 1:50 to 1:1.

Suitable polyisocyanates, when used in "blocked" form, include methylene-bis(4 - phenyl-isocyanate), metaphenylenediisocyanate, toluene - 2,4 - diisocyanate, (diphenyl ether)-2,4,4'-triisocyanate, tetramethylxylylenediisocyanate, and hexamethylenediisocyanate.

The adhesive mixture of this invention also may include formaldehyde as an optional ingredient, which reacts with pyrrolidone to form N-hydroxy-methylpyrrolidone in situ, N-hydroxymethyl-pyrrolidone has the formula

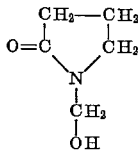

When added, it is preferred that the formaldehyde be present in sufficient quantity so that the molar ratio of pyrrolidone to formaldehyde is within the range of 1:1 to 10:1, and preferably within the range of 1.5:1 to 3:1.

In addition to the above discussed ingredients, it is essential that the adhesive mixture of this invention contain an alkaline catalyst. Suitable catalysts include sodium hydroxide, potassium hydroxide, sodium carbonate, potassium carbonate, sodium acetate, potassium acetate, and aliphatic amines such as hexamethylenediamine and piperazine. The catalyst concentration may range from 0.005% to 2.0% by weight, based upon weight of pyrrolidone. If desired, minor amounts of other materials may be present, such as wetting agents, dispersing agents, viscosity builders, and epoxide curing agents and promoters.

In some instances the alkaline catalyst may be formed in situ. For example, when the mixture contains a blocked isocyanate, alkaline materials such as amines are formed during the high temperature curing step as a result of decomposition or hydrolysis of the blocked isocyanate. In such instances no other alkaline catalyst need be added.

Before the structure is bonded to rubber, it is treated with a phenol-aldehyde-latex adhesive mixture. Where this mixture is applied as a separate step, the polymer structure bearing the cured polyepoxide-pyrrolidone coating is given a second coating of a composition containing a phenol-aldehyde condensate (e.g., as disclosed in U.S. Patent No. 2,330,217 to Hunn dated Sept. 28, 1943) and a rubber latex, preferably a butadiene-vinylpyridine latex. Such compositions and their method of application are well-known in the art, as illustrated by U.S. Patent No. 2,990,313 to Knowes et al., dated June 27, 1961. Usually it is preferred that the phenol-aldehyde-latex mixture be applied to give a dry weight pickup within the range of 4% to 8%.

In an alternative procedure, in which the polyepoxide, pyrrolidone, resorcinol-formaldehyde resin, latex and auxiliary materials are applied simultaneously in a single aqueous mixture, it is preferred that a resorcinol-formaldehyde resin be used in which the mole ratio of resorcinol to formaldehyde is between about 0.6 and 1.35, and the rubber latex, preferably a synthetic vinylpyridine copolymer latex, be present in sufficient quantity to give a weight ratio of latex solids to resorcinol-formaldehyde resin within the range from 2 to 8, and with the total weight of RFL solids constituting from about 12% to about 25% by weight of the total solids dispersed in the aqueous medium.

In a preferred embodiment of the invention, synthetic polyester yarn is coated with the polyepoxide-pyrrolidone-catalyst mixture of this invention, optionally including a blocked polyisocyanate or formaldehyde, and heated to dry and cure the coating. The coated yarn is subsequently plied and twisted into a cord structure and then overcoated with an RFL adhesive mixture, whereupon it is ready to be used as a reinforcing element in rubber articles.

In the examples illustrating the manner in which the invention may be carried out and the advantages obtained, the strength of the adhesive is determined by the "single-end strip-adhesion test" (SESA). In preparing samples for the SESA test, lengths of treated cord are placed in the bottom of a steel mold, the cords being parallel with a spacing of 1″ between cords. The cords are placed under dead-weight tension to maintain their position. A sheet of unvulcanized compounded elastomer stock, 125 mils in thickness, is placed over the cords, covered with a cotton duck reinforcing backing, and the top of the mold placed over the backing. The mold is put into a platen press. A pressure of approximately 150 p.s.i. is applied and the mold is usually heated to about 145° C. for 60 minutes. Other vulcanizing conditions appropriate for individual elastomer compositions may be used. Due to the flow of the rubber stock, the pressure within the mold falls to a low value during the curing cycle. After cooling, the specimen is removed from the press and it is found that the cords are firmly imbedded in the cured elastomer stock, but are visible on the surface. This sheet is cut into 1″ wide strips, each having a cord in the center of its width, and the cord end is separated from one end of the strip. The free end of the elastomer strip, so obtained, is clamped in the upper jaw of an Instron tensile testing machine and the freed end of cord is clamped in the lower jaw. The machine is then operated to separate the jaws and thereby strip the cord from the elastomer sheet in a continuous manner. The tension necessary to strip the cord from the elastomer sheet is determined and reported in pounds tension per single end of cord. For determination of hot adhesion, the sample is brought to a temperature of 140° C. and held there while the cord is stripped from the elastomer sheet.

The rubber stocks A and B referred to in the examples have the following compositions:

| Rubber Stock A: | Parts by weight |
| --- | --- |
| Natural rubber, smoked sheet | 50 |
| SBR-1500 | 50 |
| Stearic acid | 1 |
| Zinc oxide | 3 |
| H-A-F black | 35 |
| Circosal-Z-XH | 10 |
| Age Rite Resin D | 1 |
| NOBS special | 1.25 |
| MBTS | 0.25 |
| Sulfur | 2.5 |
| | 154.00 |

| Rubber Stock B: | Parts by weight |
| --- | --- |
| Smoked sheet blend | 90 |
| Rolled brown rubber | 10 |
| Zinc oxide | 2.8 |
| Statex B (FF Black) | 25.0 |
| Stearic acid | 1.4 |
| Pine tar | 2.1 |
| Staybelite resin | 2.0 |
| Aminox | 1.54 |
| RPA No. 2 | 0.042 |
| Retarder W | 0.3 |
| Captax | 0.55 |
| Sulfur | 2.87 |
| | 138.602 |

The following examples illustrate specific embodiments of the invention. They are not intended to limit it in any manner. All parts and percentages are by weight, unless otherwise indicated.

EXAMPLE I

This example illustrates an embodiment of the invention in which the epoxide-pyrrolidone mixture and the RFL mixture are applied in 2 separate steps.

Subcoat.—An adhesive mixture is prepared as follows: To a stirred solution of 21.25 parts of pyrrolidone and 10.12 parts of 37% aqueous formaldehyde solution is added 0.6 part of 10% aqueous sodium hydroxide solution. The mixture is allowed to react for 15 minutes, after which 4.2 parts of the polyepoxide described below, 30 parts of water and 0.8 part of 10% aqueous sodium hydroxide solution are added. In this mixture the mole ratio of pyrrolidone to formaldehyde is 2:1; the weight ratio of pyrrolidone to polyepoxide is 5:1.

The polyepoxide used above is a commercially available product prepared from glycerol and epichlorohydrin. It is a viscous liquid having an epoxide equivalent of 150 and an average molecular weight of about 310.

A polyethylene terephthalate tire cord of 840 denier (94 tex)/two-ply construction is dipped in the above mixture and then passed through an oven under tension, where the coating is dried at 218° C. for 1 minute. The amount of pickup is estimated to be 0.3% by weight.

Topcoat.—An RFL adhesive mixture is prepared by mixing 73.7 parts of resorcinol, 40.0 parts 37% formaldehyde, 148 parts water, and 480 parts of a 41% solids butadiene/styrene/vinylpyridine (70/15/15) copolymer latex, and allowing the mixture to age at room temperature for 5 days.

The tire cording bearing the epoxide-pyrrolidone subcoat, prepared above, is dipped in the RFL mixture and then passed through a 218° C. oven under tension, with an exposure time of 1 minute. The cured cord has an adhesive coating with total solids amounting to about 6% by weight.

Adhesion of the prepared cord to two different rubber stocks is measured, with the results shown in the following table. The adhesive coating is also tested for resistance to hydrolytic degradation by preparing cord-in-rubber SESA samples and exposing them to atmospheric-pressure water vapor at 160° C. for periods of 8 and 24 hours before measuring strip adhesion. These results are also shown in the table below.

TABLE 1.—RESULTS OF SINGLE-END-STRIP-ADHESION TESTS (SESA)

Using rubber stock B

| | Lbs. |
|---|---|
| SESA, 24° C. | 4.0 |
| SESA, 140° C. | 3.5 |

Using rubber stock A

| | Lbs. |
|---|---|
| SESA, 24° C.: | |
| Initial | 3.9 |
| After 8 hours exposure to water vapor at 160° C. | 2.5 |
| After 24 hours exposure to water vapor at 160° C. | 1.8 |

The outstanding performance of this embodiment of the present invention is comparable to that of nylon tire cord coated with RFL adhesive which is the present standard of the tire industry. This nylon cord construction gives an initial SESA value of 3.9 lbs. in rubber stock A at 24° C., a SESA value of 2.5 lbs. after 8 hours exposure to atmospheric-pressure water vapor at 160° C., and the SESA value falls to 1.8 lbs. after 24 hours exposure. No previous polyester-to-rubber adhesive has approached this performance.

EXAMPLE II

This is a comparative example to illustrate the importance of the subcoat. A polyester cord similar to that used in Example 1 is dipped in the RFL component only, with no epoxide-pyrrolidone subcoat present. The rubber stock and all other conditions are the same as used in Example I. The adhesion in the SESA test at 24° C. is 0.9 lb., less than ¼ the corresponding value in Example I.

EXAMPLE III

This comparative example illustrates the resistance to hydrolytic degradation of one of the better polyester-to-rubber adhesives of the prior art.

A polyethylene terephthalate tire cord of 840 denier (94 tex), two-ply construction is given an adhesive treatment as described in British Patent No. 987,600, published July 21, 1965, which requires applying a subcoat containing phenol-blocked methylene-bis-4-phenylisocyanate and an epoxy resin, curing the coating and then overcoating with the RFL adhesive mixture of Example I. The subcoating is applied to the cord and then dried at 218° C. for 1 minute, and then the RFL topcoat is applied and dried at 218° C. for 1 minute. In the SESA test this adhesive-coated cord gives a value of 4.2 lbs. Upon exposure to atmospheric-pressure water vapor at 160° C., the SESA value drops to 1.5 lbs. after 8 hours and to only 0.4 lb. after 24 hours. This loss in adhesion is considerably more than that experienced by the adhesive bond of the present invention, as illustrated in Example I.

EXAMPLE IV

This example illustrates an embodiment of the invention in which yarn is treated with the adhesive subcoat before it is made into cord.

An 840 denier (94 tex) polyethylene terephthalate high-tenacity yarn is dipped in the subcoating mixture of Example I containing pyrrolidone, formaldehyde, and polyepoxide, but with only 0.3 part of the 10% aqueous NaOH solution instead of 0.6 part. The dipped yarn is heated to a temperature of 218° C. for 1 minute to cure the coating. The yarn is then twisted 12 turns per inch S, and then 2 strands of yarn are piled and twisted 12 turns per inch Z to give an 840 denier (94 tex)/two-ply cord. The cord is then dipped in the RFL mixture of Example I and heated to 218° C. for 1 minute under tension. In the SESA test this adhesive-coated cord gives values of 2.4 lbs. in rubber stock A at 24° C., 2.8 lbs. in rubber stock B at 24° C., and 3.2 lbs. in rubber stock B at 140° C.

EXAMPLE V

This example illustrates that embodiment of the invention in which the pyrrolidone, polyepoxide, and RFL components are combined in a single-adhesive mixture and applied to the fibrous structure in one step.

An adhesive mixture is prepared as follows: To an RFL mixture prepared and aged as in Example I is added a 50% aqueous solution containing pyrrolidone, polyepoxide, and NaOH. The proportions of the ingredients are such that the final mixture has the following composition.

TABLE 2.—ADHESIVE COMPOSITION

| Ingredient: | Percent by weight |
|---|---|
| Vinylpyridine copolymer latex solids | 16.1 |
| Resorcinol-formaldehyde resin | 8.05 |
| Polyepoxide (described in Example I) | 4.3 |
| Pyrrolidone | 13.0 |
| Sodium hydroxide | 0.043 |
| Water | 58.51 |

A polyethylene terephthalate tire cord of 840 denier, two-ply construction is dipped in the adhesive mixture and then cured at 210° C. for 90 seconds. The dip pickup is found to be about 6% by weight. The adhesive-coated cord is tested for adhesion in the single-end strip-adhesion test with the results shown below. The resistance of the adhesive to hydrolytic degradation is tested as in Example I by exposure to atmospheric-pressure water vapor at 160° C. for 8 hours, with the results shown below.

TABLE 3.—EVALUATION OF DIPPED CORD

Using rubber stock B

| | Lbs. |
|---|---|
| SESA, 24° C. | 2.4 |
| SESA, 140° C. | 2.4 |

Using rubber stock A

| | Lbs. |
|---|---|
| SESA, 24° C. | 2.4 |
| SESA after 8 hours exposure to water vapor at 160° C. | 1.8 |

EXAMPLE VI

This example illustrates an embodiment of the invention in which the adhesive mixture contains both formaldehyde and blocked isocyanate in addition to the basic ingredients, pyrrplidone, polyepoxide and alkaline catalyst.

A precoating adhesive mixture is prepared by mixing 25 grams of pyrrolidone, 7.5 ml. of 37% aqueous formaldehyde solution, and 0.75 ml. of 10% aqueous sodium hydroxide solution, stirring, and allowing to age for about 10 minutes. To this mixture is added 12.5 grams of the phenol adduct of methylene bis(4-phenylisocyanate), 125 ml. of acetone and 5.0 grams of the polyepoxide described in Example I. The mixture is then ready for use.

A polyethylene terphthalate tire cord of 840 denier (94 tex), 2-ply construction is dipped in the above mixture and cured at 218° C. for 1 minute. This precoated cord is then given an RFL topcoat as described in Example I with the exception that the RFL mixture is diluted with 207 parts of water instead of 148 parts of water. The RFL coating is dried at 218° C. for 1 minute. When tested for adhesion, the coated cord gives an SESA test value of 5.2 lbs. at 24° C. in rubber stock A. The resistance of the adhesive bond to hydrolytic degradation is tested as in Example I by exposure to atmospheric-pressure water vapor at 160° C., giving SESA values of 1.6 lbs. after 8 hours and 1.4 lbs. after 24 hours.

EXAMPLE VII

This example illustrates the usefulness of the adhesive mixture of the present invention on substrates other than polyester.

An adhesive mixture is prepared by mixing 25 grams pyrrolidone, 5 grams of the polyepoxide described in Example I, 0.75 gram 10% aqueous sodium hydroxide solution, 7.5 grams of 37% aqueous formaldehyde solution, 7.5 grams of the phenol adduct of methylene bis-(4-phenylisocyanate), and 75 ml. of acetone. This mixture is applied to an 860 denier/2-ply, 12-by-12-twist, cord composed of filaments of poly[bis-(4-aminocyclohexyl)methanedodecanamide]. The dipped cord is heated to a temperature of 218° C. for 1 minute to cure the coating, then an RFL topcoat mixture, described in Example VI, is applied and dried at 218° C. for 1 minute. When tested for adhesion, this adhesive-coated cord gives an SESA test value of 5.5 lbs. at 24° C. and 2.8 lbs. at 140° C. in rubber stock A.

For comparison a cord of the same composition and construction coated only with the RFL topcoat gives SESA values of 3.0 lbs. at 24° C. and 0.4 lb. at 140° C. in rubber stock A.

EXAMPLE VIII

This example illustrates the preparation of adhesive-coated polyester yarn which can be twisted into cord and bonded to rubber after conventional overcoating with an RFL adhesive mixture.

An adhesive pre-coating mixture is prepared by mixing 45 grams pyrrolidone, 45 ml. of 37% aqueous formaldehyde solution, and 4.5 ml. of 10% aqueous sodium hydroxide solution, aging 10 minutes, and then adding this mixture to another mixture made up of 36 ml. of a 25% dispersion of phenol-blocked methylene-bis(4-phenylisocyanate), 350 ml. water, and 9 grams of the polyepoxide described in Example I.

An 840-denier, high-tenacity polyethylene terephthalate yarn is dipped in the above adhesive mixture and cured in an oven at 218° C. with an exposure time of 1 minute while allowing no stretch or shrinkage. The amount of dried coating on the yarn is found to be 1.2% by weight.

This precoated yarn is then twisted into cord as described in Example IV and given a top coating of the RFL mixture described in Example VI. The RFL-coated cord is cured at 218° C. with an exposure time of 1 minute while being stretched 5%. When tested for adhesion in rubber stock A, this cord gives an SESA value of 5 lbs. at 24° C.

EXAMPLE IX

This example illustrates an embodiment of the invention in which the optional isocyanate ingredient in the adhesive mixture is derived from an aliphatic diisocyanate.

An adhesive mixture is prepared by mixing the following components: 3 grams of the phenol adduct of hexamethylene diisocyanate, 2 grams of the polyepoxide described in Example I, 5 grams of pyrrolidone, and 80 ml. of acetone. A polyethylene terephthalate cord having an 840-denier/two-ply, 12 x 12 twist, construction is dipped in the above mixture and cured at 218° C. with an exposure time of 1 minute and with 5% applied stretch. This precoated cord is then dipped in an RFL mixture, described in Example VI, and cured at 218° C. for 1 minute with 1% applied stretch. When tested for adhesion in rubber stock A, the cord gives an SESA value of 6 lbs. at 24° C. The adhesive bond is tested for hydrolytic degradation by exposure to atmospheric pressure water vapor at 160° C. with the following results:

ADHESION LOSS BY HYDROLYTIC DEGRADATION AT 160° C.

| Exposure time, hrs.: | SESA value, lbs. |
|---|---|
| 0 | 6 |
| 8 | 3.2 |
| 16 | 2.8 |
| 24 | 2.5 |

These results indicate the superior performance of a preferred adhesive coating of this invention.

In carrying out the process of the invention described herein, the polymeric structure bearing the cured polyepoxide-pyrolidone coating overcoated with, or mixed with, the phenol-aldehyde-latex adhesive mixture, as described, may be bonded to rubber in the customary manner by use of heat and pressure to form reinforced articles in which both the dry and wet adhesion of the synthetic polymer to rubber is outstanding, and in which both cold and hot adhesion of polyester fiber structures to rubber is superior to that given by adhesives described in published literature. The adhesion afforded by the composition of this invention is superior on polyester structures over a broad range of application and testing conditions and in a wide variety of rubber stocks. Furthermore, the adhesive bond has an exceptional resistance to thermal and hydrolytic degradation. While the composition is particularly valuable for polyester structures, it is to be understood that it is also suitable for other polymeric structures, such as polyamide structures, as well as cellulosic structures and the natural fibers.

The nature of the "rubber" in the final reinforced shaped structure is not critical; it may be either a natural or a synthetic rubber. Furthermore, the technique of applying rubber to the reinforcing structure prepared in accordance with the present invention (e.g., film, fiber, or the like) is accomplished by conventional and well-known techniques. It will be apparent to those skilled in the art that the rubber stock applied thereto may contain additives such as vulcanizers, fillers, pigments, antioxidants, and the like.

Compositions produced according to the present invention may be utilized for a wide variety of important industrial applications. They may be used, for example, in the preparation of pneumatic tires for automobiles, buses, tractors, and aircraft, in transmission belts, conveyor belts, floor tiles, hoses, raincoats, luggage, and the like.

The process of the invention may be applied to the treatment of any fibrous material useful in the reinforcing of rubber products, such as cotton, rayon, nylon, and the like. However, especially valuable results are obtained when the invention is applied to polyester fibers, cords, and other shaped structures, e.g., structures prepared from polyethylene terephthalate, because of the inadequacy of previously known adhesive systems. Illustrative of the polyesters useful in preparing shaped structures which may be bonded to rubber by the process of this invention are those disclosed in U.S. Patents No. 2,465,319, No. 2,965,613 and No. 2,901,466.

Since many different embodiments of the invention may be made without departing from the spirit and scope thereof, it is to be understood that the invention is not limited by the specific illustrations.

What is claimed is:

1. A composition for precoating shaped polymeric structures of synthetic linear condensation polyester to provide improved adhesion to rubber which comprises a mixture of (a) 2-pyrrolidone, (b) a polyepoxide having an average of at least 2 epoxy groups in each molecule, a melting point below 150° C., an average molecular weight below about 3000 and an epoxide equivalent below about 2500, and (c) an alkaline catalyst; the weight ratio of polyepoxide to pyrrolidone being within the range of 1.5:1 to 1:10 and the weight of alkaline catalyst being from 0.005% to 2.0% of the weight of pyrrolidone.

2. A composition as defined in claim 1 which also contains formaldehyde and the molar ratio of pyrrolidone to formaldehyde is within the range of 1:1 to 10:1.

3. A composition as defined in claim 1 containing formaldehyde in a molar ratio of pyrrolidone to formaldehyde within the range of 1.5:1 to 3:1.

4. A composition as defined in claim 1 which also contains a blocked isocyanate of the class consisting of $R(NHCOX)_n$ and $[R'(NCO)_n]_m$ wherein R is an alkyl, aryl or alicyclic radical (R' is an alkyl or aryl radical, X represents an aryloxy, arylthio, iminoxy or lactam-N-yl radical, and $n$ and $m$ are integers of at least 2; the weight ratio of blocked isocyanate to pyrrolidone being within the range of 1:50 to 1:1.

5. A composition as defined in claim 4 containing formaldehyde in a molar ratio of pyrrolidone to formaldehyde within the range of 1:1 to 10:1.

6. A composition as defined in claim 1 containing from 12% to 25% by weight, based on the total solids present, of resorcinol-formaldehyde-latex wherein the mole ratio of resorcinol to formaldehyde is within the range of 0.6:1 to 1.35:1, and the weight ratio of latex solids to resorcinol-formaldehyde is within the range of 2:1 to 8:1.

7. A composition as defined in claim 6 wherein said latex is a synthetic vinylpyridine copolymer latex.

8. A composition as defined in claim 1 in the form of a coating on a shaped structure.

9. A yarn of synthetic linear condensation polyester fibrous material having a coating of the composition defined in claim 1.

10. A polyethylene terephthalate yarn coated with the composition defined in claim 1.

11. A rubber-reinforcing cord of polyethylene terephthalate yarn coated with the composition defined in claim 1 to provide improved adhesion when bonded to rubber with resorcinol-formaldehyde-latex adhesive.

12. The process for improving the adherence of synthetic linear condensation polyester fiber structures to rubber which comprises wetting said structure with the composition defined in claim 1 in an aqueous medium, heating the structure to dry and cure a coating of the composition thereon, and maintaining the structure under sufficient tension to prevent excessive shrinkage in the process.

13. In the process of bonding shaped structures to rubber with a resorcinol-formaldehyde-latex adhesive, the method of improving the adhesion of polyethylene terephthalate fiber structures to rubber which comprises precoating said structure with a mixture containing (a) 2-pyrrolidone, (b) a polyepoxide having an average of at least 2 epoxy groups in each molecule, a melting point below 150° C., an average molecular weight below about 3000 and an epoxide equivalent below about 2500, (c) an alkaline catalyst, (d) a phenol-blocked polyisocyanate and (e) an inert liquid medium; drying and curing the precoat while maintaining the structure under tension to prevent shrinkage; the weight ratio of polyepoxide to pyrrolidone being within the range of 1.5:1 to 1:10, the weight of alkaline catalyst being from 0.005% to 2.0% of the weight of pyrrolidone, and the weight ratio of phenol-blocked polyisocyanate to pyrrolidone being within the range of 1:50 to 1:1.

References Cited

UNITED STATES PATENTS

| 2,886,473 | 5/1959 | Schroeder | 117—143 |
| 2,922,727 | 1/1960 | Levison | 161—190 XR |
| 2,990,313 | 6/1961 | Knowles et al. | 161—241 XR |
| 3,234,067 | 2/1966 | Krysiak | 156—330 |
| 3,272,676 | 9/1966 | Kigane et al. | 156—330 XR |
| 3,307,966 | 3/1967 | Shoaf | 161—241 XR |

EARL M. BERGERT, Primary Examiner

M. E. McCAMISH, Assistant Examiner

U.S. Cl. X.R.

117—138.8; 156—331; 260—32.6, 239.3